(12) United States Patent
Yoshida

(10) Patent No.: US 7,123,561 B2
(45) Date of Patent: Oct. 17, 2006

(54) DEVICE THAT RECORDS ON AN OPTICAL DISC AND METHOD THEREOF

(75) Inventor: Tohru Yoshida, Nakanilda-Machi (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 689 days.

(21) Appl. No.: 09/809,107

(22) Filed: Mar. 16, 2001

(65) Prior Publication Data

US 2001/0043527 A1    Nov. 22, 2001

(30) Foreign Application Priority Data

May 15, 2000   (JP) .............................. 2000-142200

(51) Int. Cl.
   *B11B 5/09*    (2006.01)
(52) U.S. Cl. ................. 369/47.51; 369/116; 369/13.26
(58) Field of Classification Search ............. 369/44.17, 369/44.25, 47.51, 59.16, 59.17, 59.19, 59.21, 369/116

See application file for complete search history.

(56) References Cited

U.S. PATENT DOCUMENTS

| | | | | |
|---|---|---|---|---|
| 4,660,189 A | * | 4/1987 | Tsukamura et al. ...... | 369/53.25 |
| 4,685,097 A | * | 8/1987 | van der Put ............. | 369/53.26 |
| 5,153,871 A | * | 10/1992 | Minakuchi ................ | 369/116 |
| 5,182,741 A | * | 1/1993 | Maeda et al. ............ | 369/47.48 |
| 5,214,629 A | | 5/1993 | Watanabe | |
| 5,315,402 A | * | 5/1994 | Ito et al. ................... | 369/116 |
| 5,583,838 A | * | 12/1996 | Itoh ......................... | 369/47.31 |
| 6,317,398 B1 | * | 11/2001 | Shimada ................... | 369/47.32 |
| 6,442,115 B1 | * | 8/2002 | Shimoda et al. .......... | 369/47.28 |
| 6,504,806 B1 | * | 1/2003 | Nakajo ..................... | 369/59.12 |
| 6,704,269 B1 | * | 3/2004 | Ogawa ...................... | 369/116 |
| 6,781,937 B1 | * | 8/2004 | Nakajo ..................... | 369/59.12 |

FOREIGN PATENT DOCUMENTS

| | | |
|---|---|---|
| EP | 0414557 A2 | 2/1991 |
| JP | 7-6441 | 1/1995 |
| JP | 08-063750 | * 3/1996 |
| JP | 11-296858 | 10/1999 |

* cited by examiner

*Primary Examiner*—Tan Dinh
(74) *Attorney, Agent, or Firm*—Staas & Halsey LLP

(57) ABSTRACT

A device that records information on an optical disc and a method for recording the information on the optical disc, so as to maintain a constant recording quality when the information is recorded on the optical disc using a constant number of the rotations to control the speed. The recording device includes a linear velocity detector detects a linear velocity which is a velocity of a spot of a light, which is irradiated to record the information on a surface of the optical disc, in a tangential direction of a circumference of the optical disc, and an optical power controller controlling the optical power of the light to record the information on the surface of the optical disc based on the linear velocity detected by the linear velocity detector.

15 Claims, 1 Drawing Sheet

DEVICE THAT RECORDS ON AN OPTICAL DISC AND METHOD THEREOF

CROSS REFERENCE TO RELATED APPLICATION

This application claims priority to an application entitled "DEVICE OF RECORDING OPTICAL DISC AND METHOD THEREFOF" filed in the Japanese Patent Office on May 15, 2000 and assigned Ser. No. 2000-142200, the contents of which are hereby incorporated by reference.

BACKGROUND OF THE INVENTION

1. Field of the Invention

The present invention relates to a device that records on an optical disc, and more particularly, to a device that records information on an optical disc and a method to control the laser used to record the information.

2. Description of the Related Art

An optical disc using a dye-polymer recording material such as a CD-Recordable (CD-R) and the like operates to record the necessary information with a constant linear velocity (CLV). The optical disc provides the advantage that maintaining the recording quality is easy, because the time the laser is on to record is a constant even though the position on the optical disc being recorded may vary.

However, there is a problem in that a circuit rotating the optical disc or a spindle motor can heat up and the power used can fluctuate. Thus, the number of rotations per unit time can rapidly increase or decrease due to differences in temperature and power consumed. These variations can be as large as 2.5 times the target speed, depending on the position of the recording laser on the radius of the optical disc. Further, the problems caused prevent the recording process from happening at higher speeds.

To solve the problem, related optical recording devices control the angular velocity by controlling the number of rotations per unit time. This method results in an approximation of a constant angular velocity (CAV). However, there is still the drawback that the recording quality is not maintained by varying the irradiating time depending on the recording position, since the constant linear velocity differs depending on the position in the radius of the optical disc.

SUMMARY OF THE INVENTION

It is, therefore, an object of the present invention to provide a device that records information on an optical disc and a method for recording information on an optical disc, which can maintain a recording quality while maintaining CAV using the number of rotations per unit time as the measure.

Additional objects and advantages of the invention will be set forth in part in the description which follows, and, in part, will be obvious from the description, or may be learned by practice of the invention.

To achieve the above and other objects, there is provided an exemplary device that records information on an optical disc which is constantly rotating by a number of rotations per unit time. The device includes a linear velocity detector detecting a linear velocity that is a velocity of a spot of light which is irradiated to record the information on a surface of the optical disc in a tangential direction of a circumference of the optical disc; and an optical power controller controlling the optical power of the light to record the information on the surface of the optical disc based on the linear velocity detected by the linear velocity detector.

An exemplary linear velocity detector includes a disc clock detector that detects a pre-recorded disc clock of which frequency, along the tracks formed on the surface of the optical disc, per a unit length of the tracks is constant in any position and outputs a disc clock signal having a frequency corresponding to the linear velocity.

Another exemplary linear velocity detector includes a square root calculator calculating a square root of the voltage converted from the frequency to voltage converter, where the optical power controller controls the optical power of the light to record the information on the surface of the optical disc based on the square root calculated by the square root calculator.

To achieve the above and other objects, there is also provided a method of recording information on an optical disc which is constantly rotating by controlling the number of rotations per unit time. The method includes detecting a linear velocity that is a velocity of a spot of light which is irradiated to record the information on a surface of the optical disc in a tangential direction of a circumference of the optical disc; and controlling the optical power of the light to record the information on the surface of the optical disc based on the detected linear velocity.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION

Figure 1:
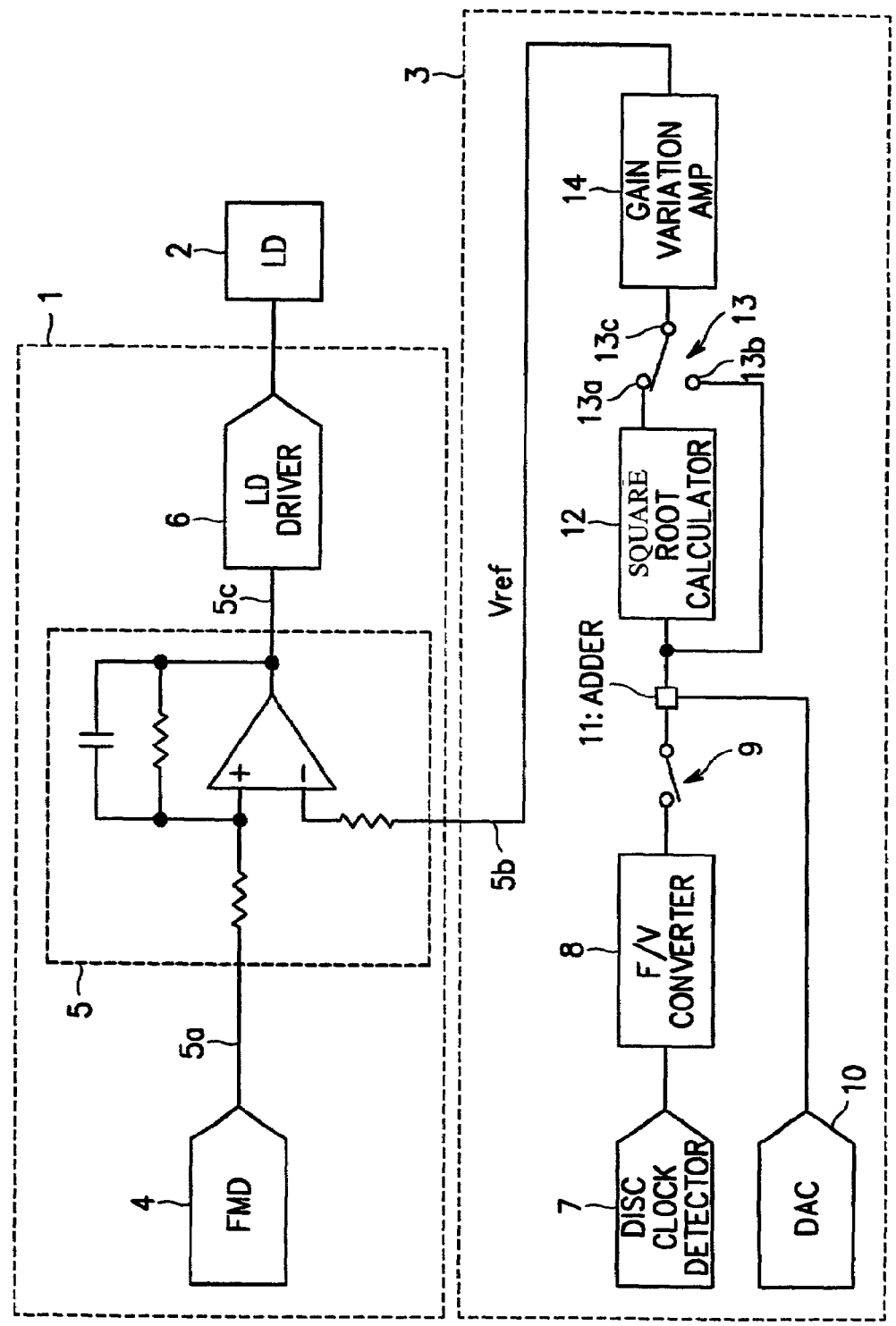
FIG. 1 is an exemplary block diagram illustrating a circuit installed on a recording device that records information on an optical disc according to an exemplary embodiment of the present invention.

Reference will now be made in detail to the preferred embodiments of the present invention, examples of which are illustrated in the accompanying drawings.

In FIG. 1, an auto power control (APC) circuit 1 constantly maintains a laser optical power irradiated to record or write information on an optical disc regardless of temperature variation and the like within the recording device.

The laser diode 2, driven by a driving current provided from the APC circuit 1, generates a laser beam directing light to the optical disc. The information is recorded or written onto an optical disc through the laser beam provided from the laser diode 2.

A linear velocity detecting circuit 3 detects the linear velocity of the optical disc and provides a control reference voltage $V_{ref}$ to the APC circuit 1 depending on the detected linear velocity. Here, the linear velocity of the optical disc is defined as a velocity of a spot of the laser beam irradiated by the laser diode 2, in a tangential direction of a circumference of the optical disc. That is to say, the linear velocity is a velocity of a scanning track formed on the surface of the optical disc by the spot of the laser beam.

The APC circuit 1 includes a front monitor diode 4 detecting a power of the laser beam generated from the laser diode 2, an optical power control circuit 5 outputting a control voltage according to the power of the laser beam detected by the front monitor diode 4, and a laser diode (LD)

driver 6 providing a driving current to the laser diode 2 according to the control voltage outputted form the optical power control circuit 5.

The front monitor diode 4 receives a part of the laser beam generated from the laser diode 2 and detects the power of the laser beam, and then outputs a detected voltage depending on the detected power.

The optical power control circuit 5 has an input terminal 5a, a control reference voltage input terminal 5b, and an output terminal 5c. The detected voltage output from the front monitor diode 4 is input to the input terminal 5a, the control reference voltage $V_{ref}$ provided from the linear velocity detecting circuit 3 is input to the control reference voltage input terminal 5b, and the control voltage is output through the output terminal 5c. The optical power control circuit 5 compares the control reference voltage $V_{ref}$ input to the control reference voltage input terminal 5b with the detected voltage input to the input terminal 5a. If the detected voltage is smaller than the control reference voltage $V_{ref}$, the optical power control circuit 5 increases the control voltage which is output through the output terminal 5c, while if the detected voltage is larger than the control reference voltage $V_{ref}$, the optical power control circuit 5 decreases the control voltage. Therefore, the power of the laser beam generated from the laser diode 2 is maintained with a value based upon the control reference voltage $V_{ref}$ regardless of the temperature variation and the like.

The LD driver 6 receives the control voltage output from the output terminal 5c of the optical power control circuit 5, and provides the driving current depending on the input control voltage to the laser diode 2.

The linear velocity detecting circuit 3 includes a disc clock detector 7 detecting a disc clock signal from the optical disc, a frequency to voltage (F/V) converter 8 converting a frequency of the disc clock signal into a voltage, a first switch 9 selectively switching the output of the F/V converter 8 to an adder 11 which will be described hereinafter, a digital to analog converter (DAC) 10 converting an analog signal into a digital signal. Depending on different kinds of the optical disc, the adder 11 adds the output of the F/V converter 8 and the output of the DAC 10, a square root calculator 12 calculates a square root of the output of the adder 11, a second switch 13 selectively bypasses the output of the square root calculator 12, and a gain variation amplifier 14 varies a gain of the output signal of the second switch 13.

The disc clock detector 7 detects the disc clock signal recorded based upon with tracks of the optical disc, and outputs the disc clock signal having the frequency in accordance with the linear velocity. The disc clock is generally formed, based upon with the tracks of the optical disc in a fabricating process of the optical disc. The disc clock signal is used as a reference determining a position where the information is recorded or written, since the disc clock signal was previously formed on the surface of the optical disc before the step of recording or writing the information on the optical disc. The disc clock signal always has the constant frequency of a unit length of the tracks.

The disc clock is the signal obtained by scanning the disc signal recorded based upon with the tracks of the optical disc by the disc clock detector 7. Accordingly, the disc clock detector 7 can obtain the disc clock signal having the constant frequency due to scanning the tracks of the optical disc with the constant velocity, as the rotation of the optical disc is controlled by the constant linear velocity, i.e., the velocity between the optical disc and the disc clock detector 7 in the tangential direction of the circumference of the optical disc. The frequency of the disc clock signal is also varied since the velocity of scanning the tracks of the optical disc by the disc clock detector 7 is varied according to the position in a radius direction of the scanning tracks, if the rotation of the optical disc is controlled to be maintained with constant the number of the rotation.

An example of the disc clock is called a wobble in the present invention. The wobble is the distance between curves of S-shaped grooves in the tracks, the number of S-shapes per the unit length of the tracks is a constant regardless of the position of the tracks. The disc clock detector 7 outputs the wobble signal when the wobble is input. The frequency of the wobble signal is a value proportional to the velocity of the optical disc, passing by the disc clock detector 7, i.e., the linear velocity.

The F/V converter 8 converts and outputs the frequency of the disc clock signal output from the disc clock detector 7 into the voltage proportioning to the frequency.

The first switch 9 selectively switches the voltage output from the F/V converter 8 to the adder 11. If the first switch 9 is closed, the voltage of the F/V converter 8 is input to the adder 11, and then the frequency of the disc clock signal reflects the power of the laser beam. That is, the power of the laser beam scanning onto the optical disc recording or writing the information is varied based upon the linear velocity. While, if the first switch 9 is opened, the voltage of the F/V converter 8 is not input to the adder 11, and then the frequency of the disc clock signal is not reflected in the power of the laser beam.

The reason for the first switch 9 is that when, according to the recording material for the optical disc, the optimized power regulation of the laser beam in recording the information is not dependent on the linear velocity.

For example, the optimized power regulation of the laser beam in recording is not dependent on the linear velocity in the optical disc when using a phase variation recording material. When recording on a phase variation recording material, the frequency of the disc clock signal does not control the power of the laser beam by opening the first switch 9.

The DAC 10 is used for recording the information using an optical disc that stores the information using a phase variation recording material and when using a constant linear velocity to record. The DAC 10 converts the target FMD output voltage to a target valve for the automatic power control loop to control the LD. That is, the control reference voltage $V_{ref}$ is determined by varying the output voltage of the DAC 10 in the above case. But, the DAC 10 outputs the constant voltage in other cases.

The adder 11 adds the output of the F/A converter 8 and the output of the DAC 10, and outputs the added result if the switch 9 is closed. But, the adder 11 outputs the output of the DAC 10 only since the output of the F/A converter 8 is not input to the adder 11, if the first switch 9 is opened.

The square root calculator 12 calculates the square root of the added result output from the adder 11 and outputs the calculated results. The reason for using the square root is to improve the recording quality, when the power of the laser beam being controlled to record uses a coloring system recording material, such as used in CD-R.

The second switch 13 selects whether to use the square root of the added result outputted to the adder 11. The detailed operation of the second switch 13 will be described hereinafter. The second switch 13 has three terminals 13a, 3b, and 13c. The calculated result output from the square root calculator 12 is input to the first terminal 13*a*, the added result output from the adder 11 is input to the second terminal 13*b*.

So, when the third terminal 13*c* of the second switch 13 as a reference point switches to the first terminal 13*a*, the calculated result of the square root calculator 12 is transferred to the next stage. Conversely, when the second and third terminals 13*b* and 13*c* of the second switch 13 are connected, the output of the square root calculator 12 is bypassed to the next stage and the square root of the added result outputted from the adder 11 is not obtained.

The reason for using the second switch 13 is that it is not always advantageous to obtain the square root of the velocity, according to the recording material used in the optical disc. For example, as described above, there is a case that the most optimized power of the laser beam in recording is not dependent on the linear velocity in the optical disc using the phase variation recording material. At this stage, the frequency of the disc clock signal is not reflected to power of the laser beam by opening the first switch 9, and the output of the square root calculator 12 is bypassed by switching the third terminal 13*c* of the second switch 13 to the second terminal 13*b*.

While, in the optical disc using the coloring system recording material, the frequency of the disc clock signal is reflected in determining the power of the laser beam by closing the first switch 9, and the square root of the calculated result output from the adder 11 is transmitted to the variation amplifier 14 by using the square root calculator 12 and switching the third terminal 13*c* of the second switch 13 to the second terminal 13*a*, since the power of the laser beam is proportioned to the square root of the linear velocity.

Therefore, the device that records on the optical disc can record on several kinds of different of discs whose relation to the recording power and the linear velocity differs, since the first and second switches 9 and 13 are equipped in the present invention.

The gain variation amplifier 14 receives the calculated result output from the square root calculator 12 or the added result output from the adder 11 through the third terminal 13*c* of the second switch 13, and amplifies the input signal with a predetermined gain and outputs the amplified result as the control reference voltage $V_{ref}$. The most optimized gain is obtained by performing a plurality of testing records through varying the gain under a case that the gain is variable and the testing record, referred to as an optimum power control (OPC), is performed on the optical disc. The most gain obtained in the OPC is used for recording the information. The control reference voltage $V_{ref}$ output from the gain variation amplifier 14 is input to the input terminal 5*b* of the optical power control circuit 5, and becomes the reference value when the power of the laser beam is controlled.

According to the frequency of the disc clock signal, a circuit varying the laser optical power of the present invention is easily added depending on the frequency of the disc clock signal without much changing of the APC circuit 1 in the related art, if the control reference voltage $V_{ref}$ of the optical power control circuit 5 which determines the power of the laser beam can be varied.

Now, the operation of the device that records information on the optical disc according to a preferred embodiment of the present invention will be explained hereinafter.

First, it is considered that the optical disc rotates with the constant angular velocity (CAV) in the embodiment of the present invention. Also, the optical disc is a CD-R (CD-Recordable) using the coloring system recording material as an example to explain the embodiment of the present invention. In the CD-R, a region being in an inner part of the data area of the optical disc is generally used since the most suitable power of the laser beam differs for each disc, and the most optimized power of the laser beam is determined by performing the testing recording which is referred to as the OPC (Optimum Power Control).

In the OPC, a lot of the input operation testing is performed by changing the control reference voltage $V_{ref}$ input to the input terminal 5*b* of the optical power control circuit 5, and the most optimized control reference voltage $V_{ref}$ is obtained from the test results.

The OPC is performed under condition that the first switch 9 is closed and the third terminal 13*c* of the second switch 13 is switched to the first terminal 13*a*. That is, the disc clock (wobble) of the disc OPC area is detected in the disc clock detector 7, and the frequency of the disc clock signal output from the disc clock detector 7 is converted into the voltage. The adder 11 adds the converted voltage and the output of the DAC 10, and the square root calculator 12 calculates the square root of the added result. The calculated result output from the square root calculator 12 is input to the gain variation amplifier 14, thereby varying the gain of the gain variation amplifier 14.] That is, a test input (writing) is applied, varying the control reference voltage $V_{refp}$ at a given number of rotations per unit time, so as to determine the most optimum gain.

The recording is performed on the data area of the optical disc after determining the most optimized gain in the gain variation amplifier 14. At this stage, the disc clock detector 7 detects the disc clock in the part performing the recording of the data, and the F/V converter 8 converts the frequency of the disc clock signal depending on the linear velocity into the voltage. Then, the square root calculator 12 calculates the square root of the voltage output from the F/V converter 8, and the gain variation amplifier 14 receives the calculated result output from the square root calculator 12 and amplifies the received signal to obtain the most optimized gain and thereby outputting the control reference voltage $V_{ref}$. The optical power control circuit 5 controls the laser beam based on the control reference voltage $V_{ref}$ as a target value. Accordingly, the most optimized gain can be automatically obtained by varying the power of the laser beam depending on the linear velocity.

Also, in the case that of a CD-RW (CD-ReWritable) and the like using a phase variation recording material, the most optimized power of the laser beam in recording is not dependent on the linear velocity. At this stage, the frequency of the disc clock signal is not reflected in determining the control reference voltage $V_{ref}$ by opening the first switch 9, and the output of the square root calculator 12 is bypassed by switching the third terminal 13*c* of the second switch 13 to the second terminal 13*b*. The control reference voltage $V_{ref}$ is controlled by varying the output of the DAC 10 since the output of the DAC 10 is directly input to the gain variation amplifier 14.

Thus, when recording the information on the optical disc in which the most optimized recording power is proportional to the linear velocity, the frequency of the disc clock signal is reflected on the control reference voltage $V_{ref}$ and the square root is not transmitted to the gain variation amplifier 14 by closing the first switch 9 by switching the third terminal 13*c* of the second switch 13 to the second terminal 13*b*.

As described above, since the device that records information on the optical disc according to the embodiment of the present invention uses exclusive hardware to control the power of laser beam, the variation of the power is continuously performed and the recording of the information is also performed at a high velocity.

Further, a Microprocessor Unit (MPU) generally installed in the recording device can perform the above operation. For instance, the MPU monitors an address including the disc clock (wobble) and varies the power of the laser beam based on the monitored address. At this time, the MPU can respond to a heavy load on the MPU by downing the sampling frequency used to change the power of the laser beam as the power of the laser beam is varied digitally, not a perfect analogy, and frequently. As a result of the frequency, the device that records information on the optical disc according to the embodiment of the present invention provides following effects.

The optical power used to record can be varied according to the linear velocity and the best optical power can be obtained, thereby maintaining the recording quality constant, when the information is recorded on the optical disc using constantly rotating with the number of rotations per unit time, since the optical power controller controls the optical power irradiating for recording the information on the surface of the optical disc based on the linear velocity detected in the linear velocity detector.

Also, the optical power used to record can be varied and the most optimized optical power can be obtained according to the frequency of the disc clock signal, thereby maintaining the recording quality constant, if the disc clock detector 7 detects the disc clock and outputs the disc clock signal having the frequency by the linear velocity, the F/V converter 8 converts the frequency of the disc clock signal into a voltage, and the optical power controller 1 controls the optical power irradiating to record on the surface of the optical disc in accordance with the frequency of the disc clock signal based on the voltage converted in the F/V converter 8.

Further, the optical power used to record can be varied and the most optimized optical power can be obtained according to the square root of the frequency of the disc clock signal, thereby maintaining the recording quality constant, if the square root calculator 12 calculates the square root of the voltage converted in the F/V converter 8, and the optical power controller 1 controls the optical power irradiating to record on the surface of the optical disc based on the square root calculated in the square root calculator 12.

Although preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A device that records information using a light on an optical disc, which is rotated at a constant speed by controlling a number of rotations per unit time used to record the information, the device comprising:
   a linear velocity detector that detects a linear velocity using a velocity of a spot of the, light, which records the information on a surface of the optical disc, in a tangential direction of a circumference of the optical disc; and
   an optical power controller that controls an optical power of the light that records the information to the optical disc based on the linear velocity detected by the linear velocity detector, wherein the linear velocity detector further comprises:
   a disc clock detector that detects a constant disc clock using tracks formed on the surface of the optical disc, even though a frequency of a length unit of the tracks previously recorded is on any position of the surface of tracks, and outputs a frequency corresponding to the linear velocity; and
   a frequency to voltage converter that converts the frequency of the disc clock detector into a voltage, wherein the optical power controller controls the optical power of the light to record the information on the surface of the optical disc based on the voltage.

2. The device of claim 1, wherein the linear velocity detector further comprises a square root calculator that calculates a square root of the voltage output by the frequency to voltage converter, and the optical power controller controls the optical power of the light to record the information on the surface of the optical disc based on the square root calculated by the square root calculator.

3. The device of claim 2, wherein the linear velocity detector further comprises a switch that selectively allows the voltage output by the frequency to voltage converter to be input to the square root calculator based on a type of the optical disc.

4. The device of claim 1, wherein the linear velocity detector further comprises:
   a digital to analog converter that outputs a second voltage; and
   an adder that adds the second voltage to the voltage output from the frequency to voltage converter, and transmits the added voltage to the output power controller.

5. The device of claim 4, wherein the linear velocity detector further comprises a switch that selectively allows the voltage output by the frequency to voltage converter to be input to the adder based on a type of the optical disc.

6. The device of claim 4, wherein the linear velocity detector further comprises a square root calculator that calculates a square root of the voltage output by the frequency to voltage converter, and the optical power controller controls the optical power of the light to record the information on the surface of the optical disc based on the square root calculated by the square root calculator.

7. The device of claim 6, wherein the linear velocity detector further comprises a selector that selectively allows F/V output voltage to be input to the square root calculator or to bypass the square root calculator.

8. The device of claim 1, further comprising:
   a microprocessor comprising the linear velocity detector and the optical power controller.

9. A device that records information using a writing laser beam on an optical disc, comprising:
   a controller which holds the optical disc to a constant speed by controlling a number of rotations per a unit of time;
   a linear velocity detector that detects a linear velocity using a velocity based on a velocity of a spot of the writing laser beam in a tangential direction; and
   an optical power controller that controls the writing laser beam to write information to the optical disc based on the linear velocity;
   wherein the linear velocity detector further comprises:
   a disc velocity detector that detects a disc velocity using a least one information track of the optical disc and outputs a frequency; and
   a frequency to voltage converter that converts the frequency of the disc velocity detector into a voltage related to the frequency, wherein the optical power controller controls the writing laser beam based on the voltage, wherein the linear velocity detector further comprises, a square root calculator that calculates a square root of the voltage output by the frequency to voltage converter, and the optical power controller controls the writing laser beam based on the square root of the voltage.

10. A device that records information using a writing laser beam on an optical disc, comprising:

a controller which holds the optical disc to a constant speed by controlling a number of rotations per a unit of time;

a linear velocity detector that detects a linear velocity using a velocity based on a velocity of a spot of the writing laser beam in a tangential direction; and an optical power controller that controls the writing laser beam to write information to the optical disc based on the linear velocity;

wherein the linear velocity detector further comprises:

a disc velocity detector that detects a disc velocity using a least one information track of the optical disc and outputs a frequency; and a frequency to voltage converter that converts the frequency of the disc velocity detector into a voltage related to the frequency, wherein the optical power controller controls the writing laser beam based on the voltage, wherein the linear velocity detector further comprises:

a digital to analog converter that outputs a second voltage; and an adder that adds the second voltage to the voltage output from the frequency to voltage converter and transmits the added voltage to the optical power controller.

11. A method of recording information using a light on an optical disc, which is constantly rotating by a number of rotations per unit time, the method comprising:

detecting a linear velocity from a velocity of a spot of the light which records the information to the optical disc, in a tangential direction of a circumference of the optical disc; and controlling the optical power of the light, to record the information to the optical disc based on the linear velocity;

wherein the linear velocity detecting further comprises:

detecting the linear velocity using a least one information track of the optical disc and outputting a frequency; and converting the frequency into a voltage related to the frequency, wherein the linear velocity detecting further comprises calculating a square root of the voltage, and the controlling of the optical power of the light is based on the square root of the voltage.

12. The method of claim 11, wherein the linear velocity detecting further comprises, selectively allowing the voltage output by the converting to have the square root calculated based on a type of the optical disc.

13. A method of recording information using a light on an optical disc, which is constantly rotating by a number of rotations per unit time, the method comprising:

detecting a linear velocity from a velocity of a spot of the light which records the information to the optical disc, in a tangential direction of a circumference of the optical disc; and controlling the optical power of the light, to record the information to the optical disc based on the linear velocity;

wherein the linear velocity detecting further comprises:

detecting the linear velocity using a least one information track of the optical disc and outputting a frequency; and converting the frequency into a voltage related to the frequency;

wherein the linear velocity detecting further comprises:

outputting a second voltage; and adding the second voltage to the voltage output from the frequency to voltage converting and the controlling of the optical power of the light is based on the adding the second voltage to the output from the frequency to voltage converting.

14. The method of claim 13, wherein the linear velocity detecting further comprises:

selectively allowing the voltage output by the frequency to voltage converting to be added to the second voltage based on a type of the optical disc.

15. A recording device that records information on an optical disc using a light from a laser, which is rotated at a constant speed, the recording device comprising:

an optical power control circuit which determines a power of the light according to a control reference voltage; and a control circuit which varies the control reference voltage according to a disc clock signal recorded on the optical disc if a recording material is a first type, wherein the control circuit comprises:

a disc clock detector that detects the disc clock signal from tracks formed on a surface of the optical disc, a digital to analog converter that generates an analog signal, and control elements that selectively use both the disc clock signal and the analog signal to determine the control reference voltage if the recording material is the first type and use the analog signal without the disc clock signal if the recording material is a second type different from the first type.

* * * * *

UNITED STATES PATENT AND TRADEMARK OFFICE
CERTIFICATE OF CORRECTION

| | | |
|---|---|---|
| PATENT NO. | : 7,123,561 B2 | Page 1 of 1 |
| APPLICATION NO. | : 09/809107 | |
| DATED | : October 17, 2006 | |
| INVENTOR(S) | : Tohru Yoshida | |

It is certified that error appears in the above-identified patent and that said Letters Patent is hereby corrected as shown below:

First Page, Column 1 (Inventor), Line 1, after "Yoshida," change "Nakanilda" to --Nakaniida--

Column 7, Line 59, before "light," change "the," to --the--.

Signed and Sealed this

Third Day of April, 2007

JON W. DUDAS
*Director of the United States Patent and Trademark Office*